United States Patent
Soto et al.

(10) Patent No.: US 11,048,657 B2
(45) Date of Patent: Jun. 29, 2021

(54) CAN BUS DRIVER WITH ACCELERATED STATE TRANSITIONS

(71) Applicant: Elmos Semiconductor SE, Dortmund (DE)

(72) Inventors: Angel Jose Soto, Dresden (DE); Michael Fiedler, Dresden (DE); Holger Jung, Dresden (DE)

(73) Assignee: ELMOS Semiconductor AG, Dortmund (DE)

( * ) Notice: Subject to any disclaimer, the term of this patent is extended or adjusted under 35 U.S.C. 154(b) by 0 days.

(21) Appl. No.: 17/027,899

(22) Filed: Sep. 22, 2020

(65) Prior Publication Data

US 2021/0089489 A1 Mar. 25, 2021

(30) Foreign Application Priority Data

Sep. 23, 2019 (DE) .................... 10 2019 125 536.8
Sep. 23, 2019 (DE) .................... 10 2019 125 538.4
Sep. 23, 2019 (DE) .................... 10 2019 125 546.5
Sep. 23, 2019 (DE) .................... 10 2019 125 547.3
Sep. 23, 2019 (DE) .................... 10 2019 125 548.1

(51) Int. Cl.
*G06F 13/40* (2006.01)
*H04B 1/38* (2015.01)

(52) U.S. Cl.
CPC ............ *G06F 13/4072* (2013.01); *H04B 1/38* (2013.01)

(58) Field of Classification Search
CPC ............ G06F 13/4072; G06F 13/4086; G06F 13/4077
See application file for complete search history.

(56) References Cited

U.S. PATENT DOCUMENTS

| 7,242,227 | B2 * | 7/2007 | Pauletti | ............... | H04L 25/0284 |
| | | | | | 327/112 |
| 9,606,948 | B2 * | 3/2017 | Monroe | ............ | G06F 13/4072 |
| 2013/0322463 | A1 * | 12/2013 | Hartwich | ............ | H04L 12/4135 |
| | | | | | 370/463 |
| 2017/0262394 | A1 * | 9/2017 | De Haas | ............ | G06F 13/4282 |
| 2019/0058614 | A1 * | 2/2019 | de Haas | .................. | H04L 69/18 |
| 2019/0131967 | A1 * | 5/2019 | Banerjee | ............ | H03K 17/6871 |
| 2019/0288870 | A1 * | 9/2019 | de Haas | .................. | H04B 3/46 |
| 2020/0364171 | A1 * | 11/2020 | Brando | ............... | G06F 13/4022 |
| 2021/0036884 | A1 * | 2/2021 | Walker | .................. | H04L 25/028 |

FOREIGN PATENT DOCUMENTS

| DE | 102017213833 A1 | 2/2019 |
| EP | 2635971 B1 | 1/2016 |
| EP | 3217602 B1 | 9/2017 |

\* cited by examiner

*Primary Examiner* — Tim T Vo
*Assistant Examiner* — Phong H Dang
(74) *Attorney, Agent, or Firm* — Mindful IP PLLC

(57) ABSTRACT

A bus driver for driving a differential data bus can be in a dominant data bus state and in a recessive data bus state. In the dominant data bus state, the bus driver connects the first and second single-wire data bus lines to a first and second electrical potential and temporarily does not drive the first and second single-wire data bus lines in the recessive data bus state. In the recessive data bus state after a change from the dominant data bus state to the recessive data bus state, bus driver connects the first and second single-wire data bus lines to a fourth electrical potential for an active time.

14 Claims, 7 Drawing Sheets

CAN BUS DRIVER WITH ACCELERATED STATE TRANSITIONS

CROSS-RELATED TO RELATED APPLICATIONS

This application claims priority to German Application No. DE 10 2019 125 548.1, filed on Sep. 23, 2019, German Application No. DE 10 2019 125 547.3, filed on Sep. 23, 2019, German Application No. DE 10 2019 125 546.5, filed on Sep. 23, 2019, German Application No. DE 10 2019 125 538.4, filed on Sep. 23, 2019, and German Application No. DE 10 2019 125 536.8, filed on Sep. 23, 2019, all of which applications are hereby incorporated herein by reference in their entireties.

TECHNICAL FIELD

The disclosure relates to a bus driver for CAN buses with an accelerated transition from the dominant to the recessive data bus state.

BACKGROUND

The CAN FD data bus requirements are reaching the limits of current CAN implementations. The waveform of the CAN transceiver changing from the dominant to the recessive state is shown in FIG. 1. The data is transmitted differentially on the CAN data bus. The CAN data bus has a first single-wire data line (CH) that can show two potential values, between a middle potential (MP) and a higher first potential (HP). The CAN data bus has a second single-wire data line (CL), which can show two potential values between a middle potential (MP) and a lower second potential (LP). In a recessive data bus phase (RBM), the first single-wire data line (CH) shows the middle potential (MP) and the second single-wire data line (CL) also assumes the middle potential (MP).

In a dominant data bus phase (DBM), the first single-wire data line (CH) has the higher potential (HP) and the second single-wire data line (CL) has the lower, second potential (LP).

The driver of the transceiver has a high output resistance in the recessive data bus phase (RBM) so that other drivers might overwrite it in the data bus system.

This construction enables an overwriting of the values without the danger of a short circuit.

The data bits (Bit0, Bit1, Bit2, Bit3) essentially have the same data bit duration (Tbit) apart from the usual clock jitter.

The problem to be solved here does not arise during the transition from the recessive data bus phase (RBM) to the dominant data bus phase (DBM), since in the new dominant data bus phase (DBM) the driver has a low output resistance and thus can quickly reload first single-wire data line (CR) and the second single-wire data line (CL) of the CAN data bus.

In the case of a transition from a dominant data bus phase (DBM) to a recessive data bus phase (RBM), however, the situation is completely different. In the recessive data bus phase (RBM), the output resistance of the bus driver is relatively high. Together with the bus capacitance, there is thus a higher first time constant for reloading the data bus in the recessive data bus phase (RBM) than the second time constant for reloading the data bus in the dominant data bus phase (DBM).

The decay time ($T_{decay}$) for the transition from the dominant data bus phase (DBM) to the recessive data bus phase (RBM) is determined by the CAN network, in particular by external discharge resistors, and not by the CAN transceiver. Ultimately, this decay time ($T_{decay}$) is a possible limitation of the speed of the bus driver and thus of the data transmission that has to be overcome.

A device and a method for serial data transmission at a high data rate are known from EP 2 635 971 B1. The device of EP 2 635 971 B1 is a device for connecting a bus subscriber to a two-wire communication bus, whereas the bus subscriber transmits messages to and receives messages from other bus participants connected to the bus using the device, where as the messages are transmitted as a sequence of dominant and recessive bus levels on the bus lines.

The device of EP 2 635 971 B1 comprises first means for setting a dominant bus level in the form of a first predetermined voltage difference between the two bus lines by driving a first electrical current.

According to the technical teaching of EP 2 635 971 B1 the device of EP 2 635 971 B1 is suitable in that way, that the recessive bus level adjusts at least partially as a second predetermined, not necessarily non-zero voltage difference between the two bus lines due to a discharge current flow through termination resistors connected to the bus lines. The technical teaching of EP 2 635 971 B1 is characterized in that the device of the EP 2 635 971 B1 comprises at least one further means to accelerate the setting of at least one of the bus levels by driving at least one suitable further electrical current, whereas the acceleration is executed upon the existance of a predefined or predefinable switchover condition. As can be seen from FIG. 5 of EP 2 635 971 B1, for this purpose a discharge is carried out over a predetermined period of time with the support of an inverted, parallel-connected differential driver. This has the disadvantage that in the case of very short data bus lines, the capacitance to be discharged can be very small and, accordingly, negative differential levels might occur on the differential data bus. This disadvantage should be avoided. The time-controlled driving of currents is therefore not effective.

A similar construction is known from U.S. Pat. No. 9,606,948 B2. There the data bus is driven to a common common-mode voltage for an active time after the transition into a recessive data bus state. However, the speed of a bus driver according to U.S. Pat. No. 9,606,948 B2 is typically not sufficient.

A similar device is known from EP 3 217 602 B1. The injection of additional currents is also proposed there, which, however, as suggested in section [0055] of EP 3 217 602 B1, results in so-called ringing, i.e. oscillations, and thus EMC loads. Since the CAN architecture does not pull the voltages on CANH and CANL during the recessive state, the time required for the transition from dominant to recessive depends entirely on the network.

DE 10 2017 213 833 A1 also discloses a BUS driver for CAN busses with a data bus state-controlled accelerated transition from the dominant to the recessive data bus state.

SUMMARY

Therefore, the proposal bases on the task to create a solution, which does not have the above disadvantages of the prior art and has further advantages.

DESCRIPTION

Figure 1:
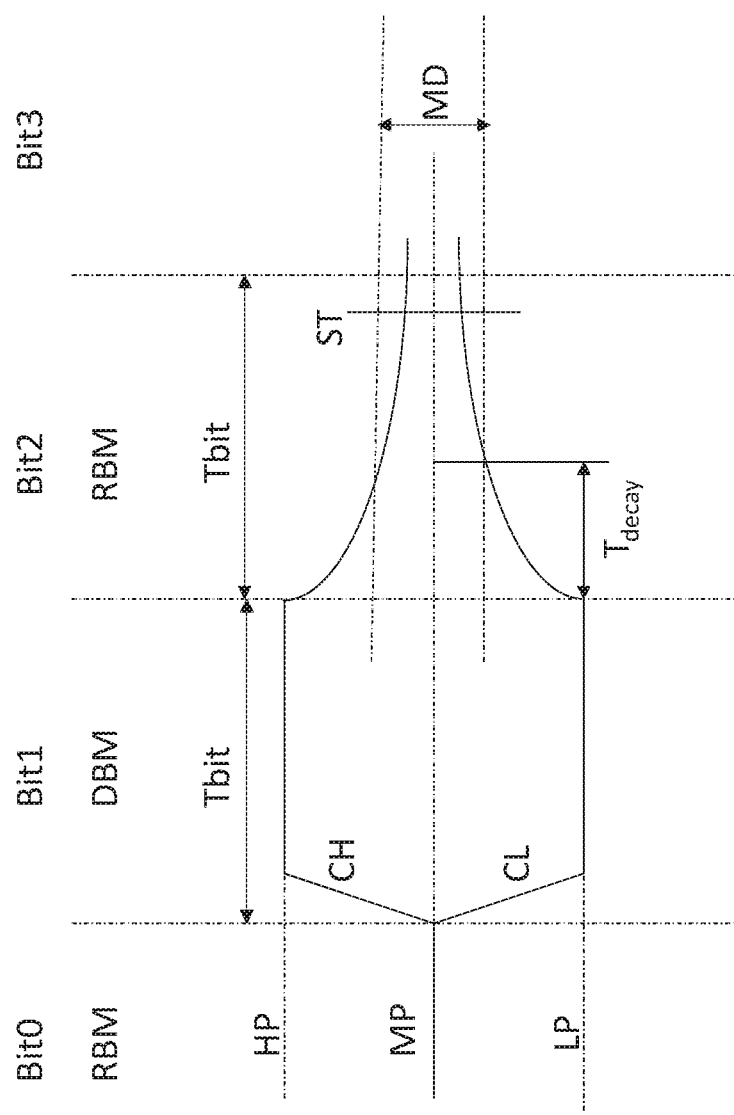
FIG. 1 illustrates a waveform of a prior art CAN Transceiver switching from the dominant state to the recessive state.

The solution is explained with reference to the figures. The proposed solution consists of
- an additional driver (%) to accelerate the transition of the driven data bus from the dominant data bus state (DBM) to the recessive data bus state (RBM),
- a logic block (SUL) to ensure the correct timing for the additional driver (%),
- whereby the driver strength of this additional driver (%) is on the one hand high enough to increase the steepness of the falling edge in terms of amount, but on the other hand the driver strength of this additional driver (%) is weak enough at the same time not to disturb the CAN bus in the arbitration phase and might be overwritten by other drivers on the data bus that drive a dominant data bus state and
- whereas after the arbitration phase the additional driver (%) can be used in the CAN FD communication in order to improve the noise-to-signal ratio, since communication takes place in one-to-one operation then, and
- whereas the additional driver (%) can be used all the time if the network consists of two CAN nodes since there is then no arbitration phase.

As explained above, the aim of the present disclosure is to shorten the decay time ($T_{decay}$) to a shortened decay time (T %) which is shorter in time than the decay time ($T_{decay}$). If this is the case, a correct differential CAN bus voltage level can be ensured at an early stage. I.e., that sufficiently early in time the voltage difference between the potential of the first single-wire data bus line (CH) minus the potential of the second single-wire data bus line (CL) falls below an absolute value of the minimum voltage difference (MD) after a shortened decay time ($T_{\%}$) after the time of termination at a transition point ($T_0$) of the dominant data bus state (DBM).

The time between the end of the dominant data bus state (DBM) and the voltage difference between the potential of the first single-wire data bus line (CH) minus the potential of the second single-wire data bus line (CL) falling below the absolute value of the minimum voltage difference amount (MD) is without the additional driver) the decay time ($T_{decay}$). In order to ensure reliable sampling of the correct data value, this decay time ($T_{decay}$) must be shorter than the time from the end of the dominant data bus state (DBM) to the time of sampling at the sampling time (ST).

The time from the end of the dominant data bus state (DBM) at the transition time ($T_0$) to the time of sampling at the sampling time (ST) must in turn be sufficiently shorter than the data bit duration (Tbit). This is required to ensure reliable sampling of the correct data bit value in the recessive data bus state (RBM) with a temporally preceding dominant data bus state (DBM) even with clock jitter.

The measures described in the following ensure that the shortened decay time ($T_{\%}$) shortened by the proposed measures allows a shortening of the time from the end of the dominant data bus state (DBM) to the transition time ($T_0$) to the point of sampling to the sampling time (ST) beyond state of the art.

This in turn enables a shortened time from the end of the dominant data bus state (DBM) at the transition time ($T_0$) to the sampling time at the sampling time (ST) to be sufficiently shorter than the temporal data bit duration (Tbit) even if this temporal data bit duration (Tbit) is shortened in such a way that, even in the case of clock jitter, reliable sampling of the correct data bit value in the recessive data bus state (RBM) is reliably possible with a preceding dominant data bus state (DBM). Thus, the shortened decay time ($T_{\%}$) allows to increase the data transmission speed of the bus driver by reducing the decay time ($T_{decay}$) to the shortened decay time ($T_{\%}$). Ultimately, this increases the network speed.

The procedure described in the following for shortening the decay time ($T_{decay}$) to the shortened decay time ($T_{\%}$) should be used preferably with special consideration of the arbitration phase and during high-speed CAN-FD transmission.

Figure 2:
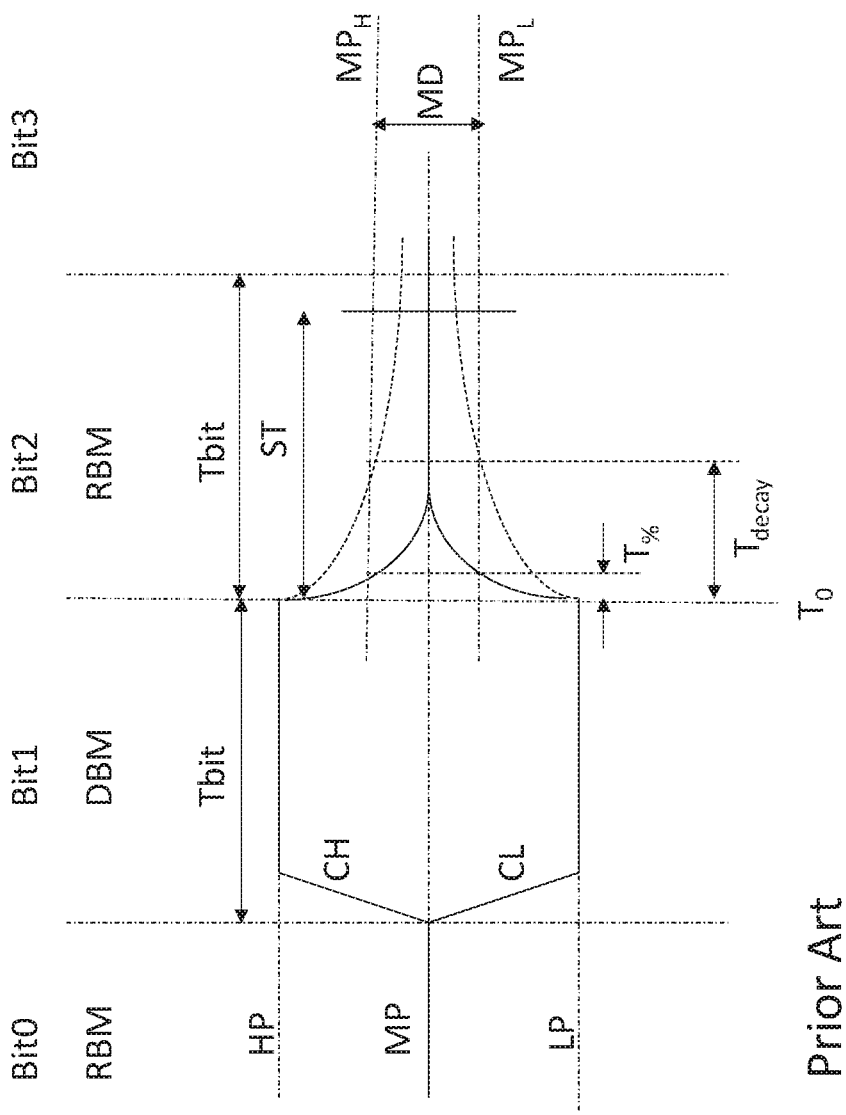
FIG. 2 illustrates a waveform of a prior art CAN transceiver switching from the dominant state to the recessive state including reloading to a single center potential.

FIG. 2 shows a reduction by reloading to a single center potential as known from U.S. Pat. No. 9,606,948 B2.

Figure 3:
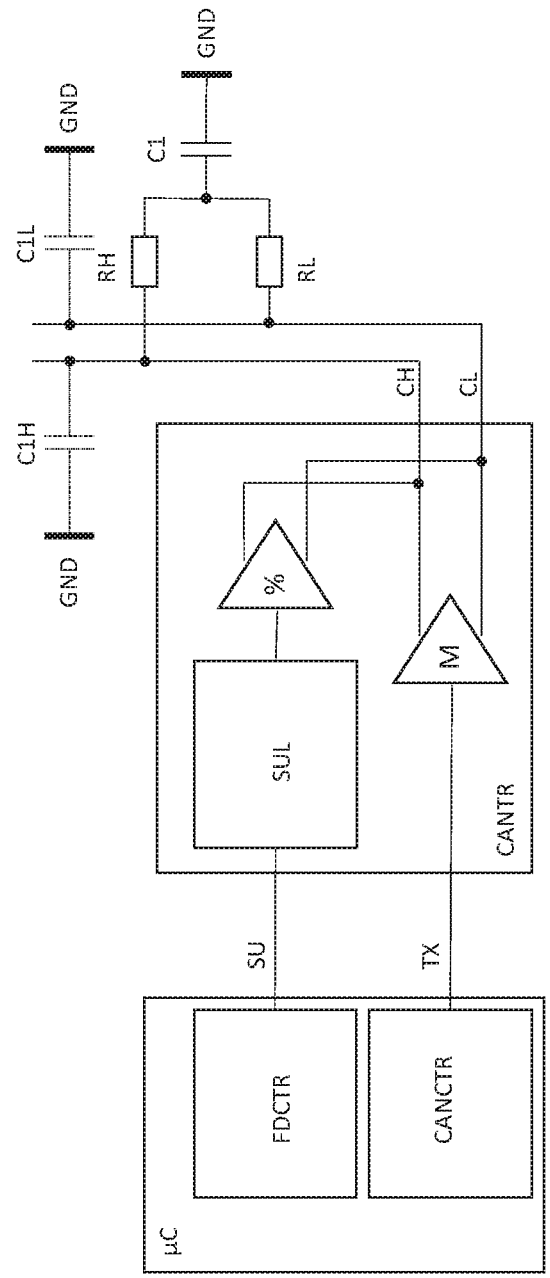
FIG. 3 is a simplified schematic of an example CAN driver including a main driver M and an additional driver %.

For this purpose, a device as shown in FIG. 3 is suggested. FIG. 3 shows the essential functional elements of the proposed device in a simplified schematic form. The device comprises a computer, preferably a microcomputer (µC). This in turn comprises a CAN controller (CANCTR) and a FD controller (FDCTR). Without shortening the decay time ($T_{decay}$), the microcomputer (µC) sends data to the CAN transceiver (CANTR) via a transmission line (TX) to its main driver (M). The main driver (M) converts the transmit signal (TX) into data bus state changes between dominant data bus states (DBM) and recessive data bus states (RBM), unless other data bus participants force dominant data bus states (DBM) because they overwrite the recessive data bus states (RBM). The potential levels of the first single-wire data bus line (CH) and the second single-wire data bus line (CL) then change according to the logical value of the transmit signal (TX), provided no other data bus participants overwrite these values. Typically, the differential two-wire data bus having a first single-wire data bus line (CH) and its second single-wire data bus line (CL) is fixed with respect to the reference potential of a reference potential line (GND) by means of a resistor network. The resistor network is in the form of a first resistor (RH) and a second resistor (RL). The differential two-wire data bus is fixed to the reference potential of a reference potential line (GND) by means of a first capacitor (C1H) and a second capacitor (C1L) regarding the alternating potential.

In the proposed device of FIG. 3, the CAN transceiver, i.e. the bus driver (CANTR), comprises the main driver (M) and now, as proposed, additionally an additional driver (%), with which the transition from the dominant data bus state (DBM) to the recessive state (RBM) can be accelerated by shortening the decay time ($T_{decay}$) to the shortened decay time ($T_{\%}$). For this purpose, the microcomputer (µC) preferably controls an acceleration logic (SUL) within the bus driver (CANTR) by means of an acceleration line (SU). Typically, the acceleration logic (SU) uses further signals within the bus driver (CANTR). For example this can be the information of the transmit signal (TX), because a reduction of the output resistance of the bus driver (CANTR) is only necessary at a transition from the dominant data bus state (DBM) to the recessive data bus state (RBM) and because only in this case the decay time (Tdecay) should be reduced in time to the shortened decay time ($T_{o\%}$). The acceleration logic (SUL) is thus preferably controlled at least by the transmit signal (TX) and an acceleration signal (SU). The acceleration signal (SU) and the transmission signal (TX) are preferably generated by the microcomputer (μC). The acceleration logic (SUL) controls the time response of the additional driver (%).

In the arbitration phase, the additional driver (%) is preferably active only for the duration of an active time ($T_A$), which is preferably chosen slightly longer than the expected shortened decay time ($T_{o\%}$) in order not to disturb the data bus in case another bus driver tries to send data to the bus, in which this other bus driver tries to bring the data bus into a dominant data bus state (DBM).

FIG. 2 illustrates the shortening of the original potential difference drop (dotted line) with an original drop time ($T_{decay}$) compared to the potential difference drop with the additional driver (%) and the shortening of the original drop time ($T_{decay}$) to the shortened decay time ($T_{o\%}$) (solid line). FIG. 2 can also be found in a similar form in U.S. Pat. No. 9,606,948 B2.

If the communication between the bus nodes, which have corresponding bus drivers (CANTR), has already been established and the high data frame rate of the CAN-FD protocol is carried out, or if the communication is a point-to-point communication, the activity time ($T_A$) of the additional driver (%) can be additionally extended until the potential of the first single-wire data line (CH) and/or the potential of the second single-wire data line (CL) reaches the center potential (MP), i.e. the potential that is assumed in the recessive data bus state (RBM). Typically, this recessive data bus potential, i.e. the center potential (MP), is close to half the operating voltage (VCC/2).

Figure 4:
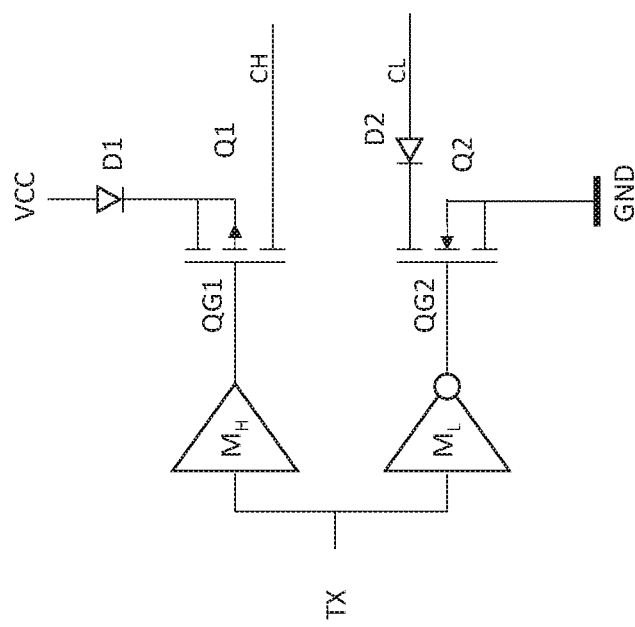
FIG. 4 is a simplified schematic of an example of the main driver M of FIG. 3.

To avoid conflicts, the additional driver (%) releases the first single-wire data bus line (CH) and the second single-wire data bus line (CL) before 70% of the time data bit duration (Tbit) has elapsed after the end of the dominant data bus state (DBM) at the transition time ($T_0$). This is done to comply with the requirements of the ISO standard. Enabling in this sense means that the additional driver (%) becomes more highly resistive at its outputs, i.e. essentially switches off, and therefore no longer supplies any significant current to the data bus or draws any significant current from the data bus, and thus no longer significantly influences the potential of the first single-wire data bus line (CH) and the potential of the second single-wire data bus line (CL). FIG. 4 shows a schematic simplified example of a main driver (M). The implementation of the main driver (M) presented in FIG. 4 is a standard CAN driver as is common in the state of the art.

The main driver (M) is designed to drive the potential of the first single-wire data bus line (CH) in the dominant data bus state (DBM) towards the potential of its operating voltage line (VCC). This causes the main driver (M) to drive the potential of the first single-wire data bus line (CH) to a first potential (HP).

The main driver (M) is designed to drive the potential of the second single-wire data bus line (CL) in the dominant data bus state (DBM) towards the potential of its reference potential on the reference voltage line (GND). This causes the main driver (M) to drive the potential of the second single-wire data bus line (CL) to a second potential (LP).

For this purpose, the main driver (M) has a first control line driver ($M_H$), which drives the first control terminal (QG1) of the first transistor (Q1) depending on the transmit signal (TX).

Furthermore, it has a second control line driver ($M_L$), which drives the second control terminal (QG2) of the second transistor (Q2) depending on the transmit signal (TX).

Here, the first transistor type of the first transistor (Q1) and the second transistor type of the second transistor (Q2), as well as the first sign of the first gain of the first control line driver ($M_H$) and the second sign of the second gain of the second control line driver ($M_L$) are preferably selected in this way, in that the first transistor (Q1) always conducts as a function of the transmission signal (TX) when the second transistor (Q2) also conducts as a function of the transmission signal (TX) and the first transistor (Q1) always blocks as a function of the transmission signal (TX) when the second transistor (Q2) also blocks as a function of the transmission signal (TX).

A first diode (D1) and a second diode (D2) are used to protect the device and determine the allowed current directions.

The first transistor (Q2) is preferably connected with its first terminal via the first diode (D1) to the supply voltage line (VCC) and preferably with its second terminal to the first single-wire data bus line (CH). The first control terminal (QG1) of the first transistor (Q1) is preferably connected to the output of the first control line driver ($M_H$) whose input is preferably connected to the transmit signal (TX).

The second transistor (Q2) is preferably connected with its first terminal to the reference potential line (GND) and preferably with its second terminal via the second diode (D2) to the second single-wire data bus line (CL). The second control terminal (QG2) of the second transistor (Q2) is preferably connected to the output of the second control line driver ($M_L$), whose input is preferably connected to the transmit signal (TX). Thus, during the dominant data bus state (DBM), this main driver (M) maintains a voltage difference between the potential of the first single-wire data bus line (CR) and the potential of the second single-wire data bus line (CL) of preferably between 3V and 1.5V according to ISO. The transmit signal (TX) controls the first control line driver ($M_H$) and the second control line driver ($M_L$).

In the example of FIG. 4, the output of the first control line driver ($M_L$) is connected to the gate of the P-channel transistor, which here form the first transistor (Q1).

In the example of FIG. 4, the output of the second control line driver ($M_L$) is connected to the gate of the N-channel transistor, which here form the second transistor (Q2).

The output signal of the second control line driver ($M_L$) is inverted with respect to the output of the first control line driver ($M_H$) to account for the inverted behavior of the P-channel transistor with respect to the N-channel transistor.

If in the example of FIG. 4 a low instantaneous voltage is present as a transmit signal (TX) compared to the potential of the reference voltage line (GND), the output of the second control line driver ($M_L$) outputs a higher potential and the N-channel transistor, i.e. the second transistor (Q2), has a low impedance and is therefore switched on.

At the same time, the output of the first control line driver ($M_H$) outputs a reduced potential and the P-channel transistor, i.e. the first transistor (Q1), is also low impedance and thus also switched on.

If in the example of FIG. 4 a high instantaneous voltage is applied as transmit signal (TX) compared to the potential of the reference voltage line (GND), the output of the second control line driver ($M_L$) outputs a lowered potential and the N-channel transistor, i.e. the second transistor (Q2), is high-impedance and thus switched off.

At the same time, the output of the first control line driver ($M_H$) then outputs an increased potential and the P-channel transistor, i.e. the first transistor (Q1), is also high-impedance and thus also switched off.

The order of the diode-transistor pairs (D1-Q1 or D2-Q2) can be swapped if the integration process allows it.

The additional driver (%) now serves to draw the potential of the first single-wire data bus line (CH) and the potential of the second single-wire data bus line (CL) during the transition from the dominant data bus state (DBM) to the recessive data bus state (RBM) to a middle third potential (MP), which should preferably be defined as half the operating voltage (VCC/2) compared to the potential of the reference potential line (GND). This additional driver (%) is preferably only active during an activation time ($T_A$), which preferably corresponds to the shortened decay time ($T_{o\%}$) or is slightly longer than this. The activation time ($T_A$) of the additional driver (%) preferably starts with the end of the dominant data bus state (DBM) at the transition time point ($T_0$), i.e. with the corresponding time of the change of the transmit signal state of the transmit signal (TX). This active time ($T_A$) preferably shorter than the temporal data bit duration (Tbit) to meet the requirements of the ISO standard.

Figure 5:
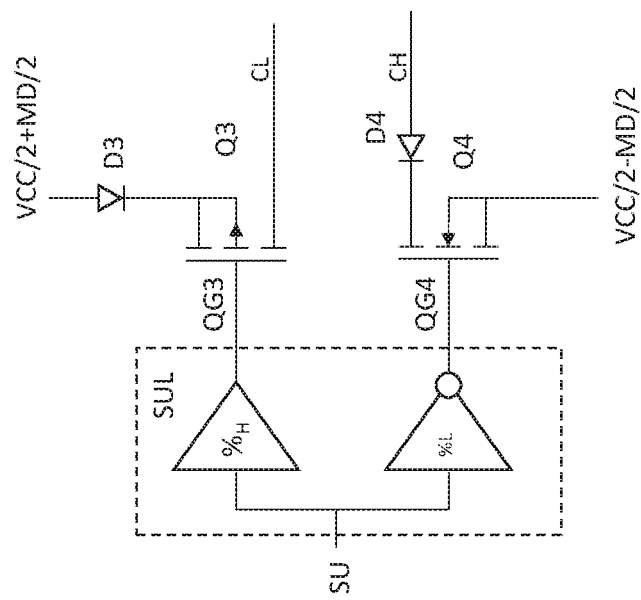
FIG. 5 is a simplified schematic of an example of the additional driver % of FIG. 3.

FIG. 5 shows a schematic simplified example of an additional driver (%). The implementation of the additional driver (%) presented in FIG. 5 is a CAN driver which, in the opinion of the applicant, is not common in the state of the art.

The additional driver (%) is designed to drive the potential of the first single-wire data bus line (CH) in the recessive data bus state (RBM) towards the fourth potential ($MP_L$), which preferably corresponds approximately to the potential of half the operating voltage (VCC/2) against the potential of the reference voltage line (GND) minus half of the absolute value of the minimum voltage difference (MD). In reality, the value actually output will move around this mean value of the fourth potential ($MP_L$) within a tolerance range between +25% and −25% and/or better between +10% and −10% of the amount of the operating voltage around this mean value of the fourth potential ($MP_L$).

The additional driver (%) is furthermore designed to also drive the potential of the second single-wire data bus line (CL) in the recessive data bus state (RBM) towards the third potential ($MP_H$), which preferably corresponds approximately to the potential of half the operating voltage (VCC/2) against the potential of the reference voltage line (GND) plus half of the absolute value of the minimum voltage difference (MD). In reality, the value actually output will move around this mean value of the third potential ($MP_H$) within a tolerance range between +25% and −25% and/or better between +10% and −10% of the amount of the operating voltage around this mean value of the third potential ($MP_H$).

For this purpose the proposed bus driver (CANTR) has a third control line driver ($\%_H$), which drives the third control terminal (QG3) of the third transistor (Q3) depending on the transmit signal (TX).

Furthermore, it has a fourth control line driver ($\%_L$), which drives the fourth control terminal (QG4) of the fourth transistor (Q4) depending on the transmit signal (TX).

Here, the third transistor type of the third transistor (Q3) and the fourth transistor type of the fourth transistor (Q4), as well as the third sign of the third gain of the third control line driver ($\%_H$) and the fourth sign of the fourth gain of the fourth control line driver ($\%_L$) are preferably selected in this way, in that the third transistor (Q3) always conducts in dependence on the acceleration signal (SU) when the fourth transistor (Q4) also conducts in dependence on the acceleration signal (SU), and in that the third transistor (Q3) always blocks in dependence on the acceleration signal (SU) when the fourth transistor (Q4) also blocks in dependence on the acceleration signal (SU).

A third diode (D3) and a fourth diode (D4) are used to protect the device and define the permitted current directions.

The third transistor (Q3) is preferably connected with its first terminal via the third diode (D3) to a first center voltage line at approximately a third potential ($MP_H$) and preferably connected with its second terminal to the second single-wire data bus line (CL). The third control terminal (QG3) of the third transistor (Q3) is preferably connected to the output of the third control line driver ($\%_H$), whose input is preferably connected to the acceleration signal (SU). The first center voltage line is preferably at half the operating voltage potential (VCC/2) plus half of the absolute value of the minimum voltage difference (MD). Under this condition, the third transistor (Q3) pulls the potential of the second single-wire data bus line (CL) to the third potential (MPH) when the third transistor (Q3) is switched conductive.

The fourth transistor (Q4) is preferably connected with its first terminal to a second center voltage line at approximately a fourth potential ($MP_L$) and preferably with its second terminal to the first single-wire data bus line (CH) via the fourth diode (D4). The fourth control terminal (QG4) of the fourth transistor (Q4) is preferably connected to the output of the fourth control line driver ($\%_L$), whose input is preferably connected to the acceleration signal (SU). The second center voltage line is preferably at half the operating voltage potential (VCC/2) minus half the minimum voltage difference. Under this condition, the fourth transistor (Q4) draws the potential of the first single-wire data bus line (CH) to the fourth potential (MPL) when the fourth transistor (Q4) is switched conductive.

There is an essential difference to FIG. 9 of U.S. Pat. No. 9,606,948 B2, where transistor 925 is connected to the single-wire data bus line CANH and transistor 935 to the single-wire data bus line CANL. The circuit arrangement shown in this way cannot physically lead to the desired result. In this respect, FIG. 5 of the disclosure presented here is different from FIG. 9 of U.S. Pat. No. 9,606,948 B2 and is therefore explicitly claimed to be different even if the minimum voltage difference is 0V.

Thus this additional driver (%) during the dominant data bus state (DBM) preferably does not influence the voltage difference between the potential of the first single-wire data bus line (CH) and the potential of the second single-wire data bus line (CL), because it then blocks as a result of the swapping of the single-wire data buses and as a result of suitable activation via the acceleration signal (SU).

The acceleration signal (SU) controls the third control line driver ($\%_H$) and the fourth control line driver ($\%_L$).

In the example of FIG. 5, the output of the third control line driver ($\%_L$) is connected to the gate of the P-channel transistor, which here forms the third transistor (Q3).

In the example of FIG. 5, the output of the fourth control line driver ($\%_L$) is connected to the gate of the N-channel transistor, which here forms the fourth transistor (Q4).

The output signal of the fourth control line driver ($\%_L$) is inverted with respect to the output of the third control line driver (%$_H$) to account for the inverted behavior of the P-channel transistor with respect to the N-channel transistor.

If in the example of FIG. 5 as acceleration signal (SU) a low instantaneous voltage is present as compared to the potential of the reference potential line (GND), the output of the fourth control line driver (%$_L$) outputs an increased potential and the N-channel transistor, i.e. the second transistor (Q2) is low-resistance and thus switched on.

At the same time, the output of the third control line driver (%$_H$) outputs a reduced potential and the P-channel transistor, i.e. the third transistor (Q3), is also low impedance and thus also switched on.

If in the example of FIG. 5 as acceleration signal (SU) a high instantaneous voltage is present compared to the potential of the reference potential line (GND), the output of the fourth control line driver (%$_L$) outputs a reduced potential and the N-channel transistor, i.e. the fourth transistor (Q4) is high-impedance and thus switched off.

At the same time, the output of the third control line driver (%$_H$) then outputs an increased potential and the P-channel transistor, i.e. the third transistor (Q3) is also high-impedance and thus also switched off.

The order of the diode-transistor pairs (D3-Q3 or D4-Q4) can be swapped if the integration process allows it.

Figure 6:
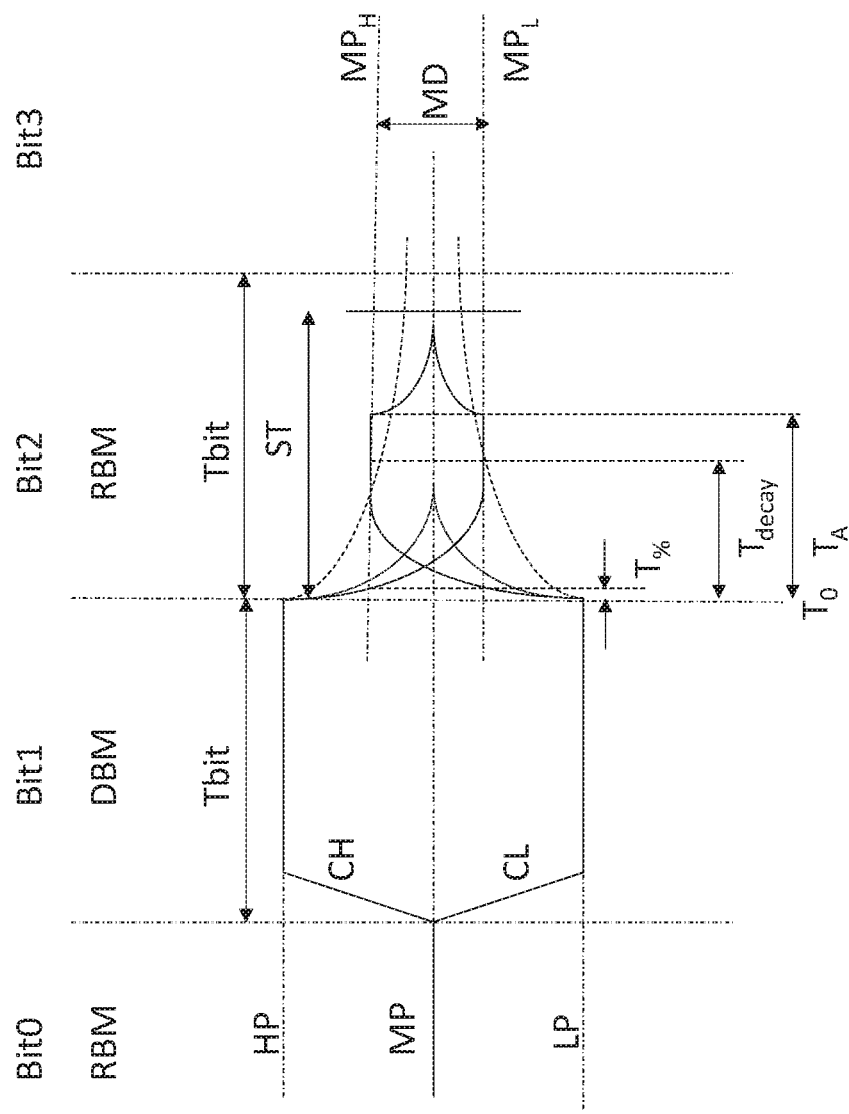
FIG. 6 illustrates an example waveform of the CAN driver of FIG. 3.

FIG. 6 corresponds to FIG. 2 with the difference that now, as suggested, the additional driver (%) drives the first single-wire data line (CH) not with a center potential (VCC/2) but with a fourth potential (MPL), which is selected lower. In the example, the fourth potential (MPL) essentially corresponds to the potential of the reference potential plus half the operating voltage (VCC) minus half of the absolute value of the minimum voltage difference (MD).

Another difference between FIG. 2 and FIG. 6 is that now, as suggested, the additional driver (%) drives the second single-wire data line (CL) not with a center potential (VCC/2) but with a third potential (MPH), which is chosen higher. In the example, the third potential (MP$_H$) essentially corresponds to the potential of the reference potential plus half the operating voltage (VCC) plus half of the absolute value of the minimum voltage difference (MD). As can easily be seen, the shortened decay time (T$_{0\%}$) is shortened again, which is a significant advantage over the state of the art.

FIG. 6 shows an exemplary signal form.

In FIG. 6 it can be seen that the acceleration signal (SU) remains at a high level except for the period of an active time (T$_A$) after the rising edge of the transmit signal (TX), which marks the transition time point (T$_0$). The duration of the active time (T$_A$) should be equal to or longer than the duration of the shortened decay time (T$_{0\%}$). The active time (T$_A$) starts at the transition time point (T$_0$). Furthermore, the duration of the active time (T$_A$) should be less than 70% of the data bit duration (Tbit) to meet the ISO standard. In the example in FIG. 6, the transmit signal (TX) can assume the exemplary logical values 1 and 0. In the example shown in FIG. 6, the acceleration signal (SU) can take the exemplary logical values 1 and 0. In the example in FIG. 6, the bus driver (CANTR) puts the data bus into a dominant data bus state (DBM) when the logical value of the transmit signal (TX) is 0. In the example of FIG. 6, the driver (CANTR) allows the data bus to change to a recessive data bus state (RBM) if the logical value of the transmit signal (TX) is 1. An additional circuit—here the additional driver (%)—in interaction with the acceleration logic (SUL) and the microcomputer (μC), then brings the data bus into the recessive data bus state (RBM). The recessive data bus state (RBM) permitted by the bus driver can be overwritten by other bus drivers on the data bus that want to imprint a dominant data bus state (DBM).

As can be seen in the exemplary FIGS. 4 and 5, the additional driver (%) has a similar structure as the main driver (M). It differs from the main driver (M) in that it preferentially applies a differential voltage to the data bus that is essentially equal to or only slightly different from the negative minimum voltage difference (MD) and that it can be overwritten by other bus drivers and that it nevertheless preferentially applies a common mode potential to the data bus that is essentially half the operating voltage. The acceleration signal (SU) controls the third control line driver (%$_H$) and the fourth control line driver (%$_L$). Their outputs are each connected to the gates of the P-MOS transistor, which here is the third transistor (Q3), and the N-MOS transistor, which here is the fourth transistor (Q4). The P-MOS transistor, here the third transistor (Q3), is connected by its drain to the second single-wire data bus line (CL), while its source terminal is connected to the cathode of the third diode (D3). The anode of the third diode (D3) is connected to the recessive voltage reference in the form of the first medium voltage line, which is at the third potential (MP$_H$), which typically corresponds to half the operating voltage (VCC/2) with respect to the potential of the reference voltage line (GND) plus half of the absolute value of the minimum voltage difference (MD). The source terminal of the N-MOS transistor, which in this case is the fourth transistor (Q4), is connected to the recessive voltage reference in the form of the second medium voltage line, which is at the fourth potential (MP$_L$), which typically corresponds to half the operating voltage (VCC/2) with respect to the potential of the reference voltage line (GND) minus half of the absolute value of the minimum voltage difference (MD). The drain connection of the N-MOS transistor, which is the fourth transistor (Q4) here, is connected to the cathode of the fourth diode (D4) here as an example. The anode of the fourth diode (D4) is connected to the first single-wire data bus line (CH). The order of the diode-transistor pairs (D3-Q3 or D4-Q4) can be reversed if the integration process allows it.

When the acceleration signal (SU) is low, the potential of the output of the fourth control line driver (%$_L$) is high and the output of the third control line driver (%$_H$) is low in potential, turning on the third transistor (Q3) and the fourth transistor (Q4). When the acceleration signal (SU) is high, the potential of the output of the fourth control line driver (%$_L$) is low and the output of the third control line driver (%$_H$) is high in potential, thus turning off the third transistor (Q3) and the fourth transistor (Q4).

The on-resistance of the third transistor (Q3) and the fourth transistor (Q4) in the additional driver (%) should be higher than the on-resistance of the first transistor (Q1) and the second transistor (Q2) in the main driver (M). This way the bus driver of another node in the network can drive the single-wire data bus lines of the data bus during the arbitration phase without being disturbed by the additional driver (%).

Figure 7:
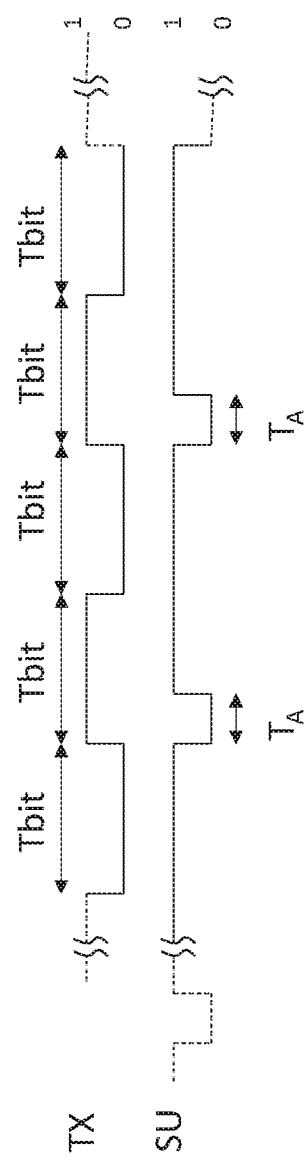
FIG. 7 illustrates a typical timing diagram for the acceleration signal (SU) with exemplary logical levels relative to an exemplary 101010 transmission on the transmission line (TX).

FIG. 7 shows a typical timing diagram for the acceleration signal (SU) with exemplary logical levels relative to an exemplary 101010 transmission on the transmission line (TX). In FIG. 7, it can be seen that the acceleration signal (SU) remains at a high level except for the period of an active time (T$_A$) after the rising edge of the transmit signal (TX). Furthermore, the duration of the active time (T$_A$) should be less than 70% of the data bit duration (Tbit) to meet the ISO standard.

Examples according to the disclosure are discussed below. The examples can be combined with each other.

EXAMPLE 1

Data Bus State Controlled Example

Example 1 concerns a bus driver (CANTR) for driving a differential data bus, whereby the differential data bus comprises a first single-wire data bus line (CH) and a second single-wire data bus line (CL). The data bus can be in a dominant data bus state (DBM) and in a recessive data bus state (RBM). In the dominant data bus state (DBM), the bus driver connects the first single-wire data bus line (CH) to a first electrical potential (HP). This first electrical potential (HP) typically corresponds essentially to the supply voltage (VCC) against the reference potential of the reference potential line (GND) except for a small voltage drop across the switching transistors.

In the dominant data bus state (DBM), the bus driver connects the second single-wire data bus line (CL) to a second electrical potential (LP) that is different from the first electrical potential (HP). This second electrical potential (LP) typically corresponds essentially to the reference potential of the reference potential line (GND) except for a small voltage drop across the switching transistors.

The bus driver temporarily does not drive the first single-wire data bus line (CH) in recessive data bus state (RBM). This means that it is high-impedance and does not essentially influence the potentials of the single-wire data bus lines (CH, CL) of the data bus. This essentially means that leakage currents and the like are neglected.

The bus driver temporarily does not drive the second single-wire data bus line (CL) in recessive data bus state (RBM). This means that it is high-impedance and does not essentially influence the potentials of the single-wire data bus lines (CH, CL) of the data bus. This essentially means that leakage currents and the like are neglected.

The proposed bus driver is characterized in that the bus driver in the recessive data bus state (RBM) after a change from the dominant data bus state (DBM) to the recessive data bus state (RBM) connects the first single-wire data bus line (CH) to a fourth electrical potential ($MP_L$) for an active time ($T_A$) and in that the bus driver in the recessive data bus state (RBM), after this change from the dominant data bus state (DBM) to the recessive data bus state (RBM), connects the second single-wire data bus line (CL) to the third electrical potential ($MP_H$) for an active time ($T_A$). The third electrical potential ($MP_H$) is different from the first electrical potential (HP) and from the second electrical potential (LP) and the value of the third electrical potential ($MP_H$) is preferably between the value of the first electrical potential (HP) and the value of the second electrical potential (LP). The fourth electrical potential ($MP_L$) is different from the first electrical potential (HP) and from the second electrical potential (LP) and from the third electrical potential ($MP_H$) and the value of the fourth electrical potential ($MP_L$) is preferably between the value of the third electrical potential ($MP_H$) and the value of the second electrical potential (LP).

In a first sub-example, the active time ($T_A$) is no more than 70% of the data bit duration (Tbit), which ensures reliable sampling at the sampling time (ST).

Preferably the shortened decay time ($T_{0\%}$) is shorter than the active time ($T_A$).

Preferably, the value of the third electrical potential (MP) does not deviate by more than 25% and/or not more than 10% from the value of the second electrical potential (LP) plus half the difference in value between the value of the first electrical potential (HP) minus the value of the second electrical potential (LP).

Preferably, the value of the third electrical potential ($MP_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential ($MP_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

EXAMPLE 2

Transmission Signal Controlled

Example 2 concerns a bus driver (CANTR) for driving a differential data bus, whereby the differential data bus comprises a first single-wire data bus line (CH) and a second single-wire data bus line (CL). The bus driver has a transmit signal input connected to a transmit signal (TX). The transmit signal (TX) can have a first transmit signal state and a second transmit signal state. A first output of the bus driver is preferably connected to the first single-wire data bus line (CH) and a second output of the bus driver (CANTR) is preferably connected to the second single-wire data bus line (CL). The bus driver (CANTR) has a first bus driver state and a second bus driver state and a third bus driver state. The bus driver is in the first bus driver state when the transmit signal (TX) is in the first transmit signal state. The bus driver (CANTR) is in the third bus driver state when the transmit signal (TX) is in the second transmit signal state and when the transmit signal (TX) has previously made a state transition from the first transmit signal state to the second transmit signal state at a transition time point ($T_0$) and when an active time ($T_A$) has not yet elapsed since this transition time point ($T_0$). The bus driver (CANTR) is in the second bus driver state if the transmit signal (TX) is in the second transmit signal state and if the transmit signal (TX) has performed a state transition from the first transmit signal state to the second transmit signal state at a transition time point ($T_0$) and if an active time ($T_A$) has already elapsed since this transition time point ($T_0$).

The bus driver (CANTR) applies a first electrical potential (HP) to the first single-wire data bus line (CH) when in the first bus driver state and applies a second electrical potential (LP) to the second single-wire data bus line (CL) when in the first bus driver state.

The bus driver (CANTR) applies a fourth electrical potential ($MP_L$) to the first single-wire data bus line (CH) when in the third bus driver state and applies the third electrical potential ($MP_H$) to the second single-wire data bus line (CL) when in the third bus driver state.

The bus driver (CANTR) does not apply electrical potential to the first single-wire data bus line (CH) when in the second bus driver state and does not apply electrical potential to the second single-wire data bus line (CL) when in the second bus driver state. This means that its outputs are essentially high-impedance in the second bus state.

Again, the first electrical potential (HP) differs from the second electrical potential (LP) and from the third electrical potential (MP$_H$) and fourth electrical potential (MP$_L$). The third electrical potential (MP$_H$) differs again from the second electrical potential (LP) and the fourth electrical potential (MP$_L$). The fourth electrical potential (MP$_L$) is again different from the second electrical potential (LP). The value of the third electrical potential (MP$_H$) is preferably located between the value of the first electrical potential (HP) and the value of the second electrical potential (LP). The value of the fourth electrical potential (MP$_L$) is preferably between the value of the third electrical potential (MP$_H$) and the value of the second electrical potential (LP).

Preferably the shortened decay time (T$_{o\%}$) is smaller than the active time (T$_A$).

Preferably the active time (T$_A$) is less than 70% of the data bit duration (Tbit).

Preferably, the value of the third electrical potential (MP$_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential (MP$_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

EXAMPLE 3

Bus Driver State Bus Controlled

Example 3 concerns a bus driver (CANTR) for driving a differential data bus, whereby the differential data bus comprises a first single-wire data bus line (CH) and a second single-wire data bus line (CL). The bus driver (CANTR) now includes a status bus input. The state bus input of the bus driver (CANTR) is connected to a state bus. The state bus has a preferred first, second and third state bus state. A first output of the bus driver (CANTR) is connected to the first single-wire data bus line (CH) and a second output of the bus driver (CANTR) is connected to the second single-wire data bus line (CL). The bus driver (CANTR) again has a first bus driver state and a second bus driver state and a third bus driver state. The bus driver (CANTR) is preferably in the first bus driver state when the state bus is in the first state bus state. The bus driver (CANTR) is preferably in the second bus driver state when the state bus is in the second state bus state. The bus driver (CANTR) is preferentially in the third bus driver state when the state bus is in the third state bus state. The bus driver (CANTR) preferentially applies a first electrical potential (HP) to the first single-wire data bus line (CH) when in the first bus driver state. Similarly, the bus driver (CANTR) prefers to apply a second electrical potential (LP) to the second single-wire data bus line (CL) when in the first bus driver state. The bus driver applies a fourth electrical potential (MP$_L$) to the first single-wire data bus line (CH) and the third electrical potential (MP$_H$) to the second single-wire data bus line (CL) when in the third bus driver state.

The bus driver (CANTR) does not apply electrical potential to the first single-wire data bus line (CH) and to the second single-wire data bus line (CL) when in the second bus driver state.

The first electrical potential (HP) is preferably different again from the second electrical potential (LP).

The third electrical potential (MP$_H$) is again preferably different from the first electrical potential (HP) and from the second electrical potential (LP) and fourth electrical potential (MPL).

The fourth electrical potential (MP$_L$) is again preferably different from the first electrical potential (HP) and the second electrical potential (LP).

The value of the third electrical potential (MP) is preferably located between the value of the first electrical potential (HP) and the value of the second electrical potential (LP).

Preferably, the value of the third electrical potential (MP$_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential (MP$_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

Preferably the state bus has a transmit signal (TX) and an acceleration signal (SU).

The bus driver of this example includes a preferred operating procedure. It comprises the steps;

Operating the bus driver in the first bus driver state;

Operation of the bus driver in the third bus driver state for an active time (T$_A$) after the termination of the operation of the bus driver in the first bus driver state at a transition time point (T$_0$)

Operation of the bus driver in the second bus driver state after termination of the operation of the bus driver in the first bus driver state at a transition time point (T$_0$) and after expiration of the subsequent active time (T$_A$);

Preferably the shortened decay time (T$_{o\%}$) is less than the active time (T$_A$) and/or the active time (T$_A$) is less than 70% of the data bit duration (Tbit).

EXAMPLE 4

Transmission Signal Controlled Operation

Example 4 concerns a procedure for controlling a differential data bus. Here the control of the data bus by the bus driver depends on a transmit signal state of a transmit signal (TX). The transmit signal (TX) can preferably have a first transmit signal state and a second transmit signal state. There are also multi-valued logics conceivable, but they are not discussed further here.

The differential data bus comprises a first single-wire data line (CH) and a second single-wire data line (CL). The procedure comprises the following steps:

Apply a first electrical potential (HP) to the first single-wire data bus line (CH) when the transmit signal (TX) is in the first transmit signal state. In this case, the first potential (HP) typically corresponds essentially to the potential of the supply voltage line (VCC) except for parasitic voltage drops across the switches;

applying a second electrical potential (LP) to the second single-wire data bus line (CL) when the transmit signal (TX) is in the first transmit signal state and wherein the first electrical potential (HP) is different from the second electrical potential (LP). In this case, the second potential (LP) corresponds essentially to the potential of the reference potential line (GND) except for parasitic voltage drops across the switches;

applying a fourth electrical potential ($MP_L$) to the first single-wire data bus line (CH) when the transmission signal (TX) is in the second transmission signal state and when the transmission signal (TX) has made a state transition from the first transmission signal state to the second transmission signal state at a transition time point ($T_0$) and when an active time ($T_A$) has not yet elapsed since this transition time point ($T_0$);

applying a third electrical potential ($MP_H$) to the second single-wire data bus line (CL) when the transmission signal (TX) is in the second transmission signal state and when the transmission signal (TX) has made a state transition from the first transmission signal state to the second transmission signal state at a transition time point ($T_0$) and when an active time ($T_A$) has not yet elapsed since this transition time point ($T_0$);

applying no electrical potential to the first single-wire data bus line (CH) and to the second single-wire data bus line (CL) if the transmission signal (TX) is in the second transmission signal state and if the transmission signal (TX) has made a state transition from the first transmission signal state to the second transmission signal state at a transition time point ($T_0$) and if an active time ($T_A$) has already elapsed since this transition time point ($T_0$).

Preferably, the fourth electrical potential ($MP_L$) is applied to the first single-wire data line (CH) and the third electrical potential ($MP_H$) is applied to the second single-wire data line (CL) with such low resistance that the shortened decay time ($T_{o\%}$) is less than the active time ($T_A$).

Preferably the active time ($T_A$) is less than 70% of the data bit duration (Tbit).

Preferably, the value of the third electrical potential ($MP_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential ($MP_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

EXAMPLE 5

Control According to the Data Bus to be Forced

The fifth example concerns a method for driving a differential data bus, whereby the data bus states that can be forced on the data bus in the method comprise a dominant data bus state (DBM) and a recessive data bus state (RBM). The differential data bus has a first single-wire data line (CH) and a second single-wire data line (CL). The procedure comprises the following steps:

Apply a first electrical potential (HP) to the first single-wire data bus line (CH) if a dominant data bus state (DBM) is to be forced on the data bus. In this case, the first potential (HP) typically corresponds essentially to the potential of the supply voltage line (VCC) except for parasitic voltage drops across the switches;

applying a second electrical potential (LP) to the second single-wire data bus line (CL) when a dominant data bus state (DBM) is to be forced on the data bus, wherein the first electrical potential (HP) is different from the second electrical potential (LP). In this case, the second potential (LP) corresponds essentially to the potential of the reference potential line (GND) except for parasitic voltage drops across the switches;

applying a fourth electrical potential ($MP_L$) to the first single-wire data bus line (CH) if a recessive data bus state (RBM) is to be permitted on the data bus and if a transition from a dominant data bus state (DBM) to be forced to a recessive data bus state (RBM) to be permitted has occurred at a transition time point ($T_0$) and if an active time ($T_A$) has not yet elapsed since this transition time point ($T_0$);

applying a third electrical potential ($MP_H$) to the second single-wire data bus line (CL) if a recessive data bus state (RBM) is to be permitted on the data bus and if a transition from a dominant data bus state (DBM) to be forced to a recessive data bus state (RBM) to be permitted has occurred at a transition time point ($T_0$) and if an active time ($T_A$) has not yet elapsed since this transition time point ($T_0$);

Application of no electrical potential to the first single-wire data bus line (CH) and to the second single-wire data bus line (CL) if a recessive data bus state (RBM) is to be permitted on the data bus and if a transition from a dominant data bus state (DBM) to be impressed to a recessive data bus state (RBM) to be permitted has occurred at a transition time point ($T_0$) and if an active time ($T_A$) has already elapsed since this transition time point ($T_0$);

Preferably, the fourth electrical potential ($MP_L$) is applied to the first single-wire data line (CH) and the third electrical potential ($MP_H$) is applied to the second single-wire data line (CL) with such low resistance that the shortened decay time ($T_{o\%}$) is less than the active time ($T_A$).

Preferably the active time ($T_A$) is less than 70% of the data bit duration (Tbit).

Preferably, the value of the third electrical potential ($MP_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential ($MP_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

EXAMPLE 6

Additional Second Voltage Source

The sixth example concerns a bus driver (CANTR) for driving a differential data bus, whereby the differential data bus comprises a first single-wire data bus line (CH) and a second single-wire data bus line (CL). The data bus can be in a dominant data bus state (DBM) and in a recessive data bus state (RBM). The bus driver (CANTR) comprises a first voltage source, in particular a first voltage regulator and/or voltage converter, having an operating voltage between a first supply voltage line substantially at a first potential (HP) and a second supply voltage line substantially at a second potential (LP), which for the purpose of this disclosure can be interpreted as set and output for use by the bus driver.

In the dominant data bus state (DBM), the bus driver (CANTR) applies the first single-wire data bus line (CH) to the first electrical potential (HP) which substantially corresponds to the supply voltage potential (VCC) except for said parasitic voltage drops, and the second single-wire data bus line (CL) to the second electrical potential (LP) which substantially corresponds to the reference potential of the reference potential line (GND) except for the parasitic voltage drops and which is different from the first electrical potential (HP).

The bus driver (CANTR) temporarily does not drive the first single-wire data bus line (CH) and the second single-wire data bus line (CL) in the recessive data bus state (RBM).

The bus driver (CANTR) corresponding to this sixth example is characterized in that the bus driver (CANTR) has a second voltage source that generates a first center voltage that is essentially at a third potential ($MP_H$), and that the bus driver (CANTR) has a third voltage source that generates a second center voltage that is essentially at a fourth potential ($MP_L$).

In the recessive data bus state (RBM), after a change from the dominant data bus state (DBM) to the recessive data bus state (RBM), the bus driver (CANTR) sets the first single-wire data bus line (CH) to the fourth electrical potential ($MP_L$) for an active time ($T_A$) and the second single-wire data bus line (CL) to the third electrical potential ($MP_H$) for an active time ($T_A$). The third electrical potential ($MP_H$) is preferably different from the first electrical potential (HP) and from the second electrical potential (LP) and the fourth electrical potential ($MP_L$). The fourth electrical potential (MPL) is preferably different from the first electrical potential (HP) and from the second electrical potential (LP). The value of the third electrical potential ($MP_H$) is preferably between the value of the first electrical potential (HP) and the value of the second electrical potential (LP). The value of the fourth electrical potential ($MP_L$) is preferably between the value of the third electrical potential ($MP_H$) and the value of the second electrical potential (LP).

Preferably, the active time ($T_A$) is no more than 70% of the data bit duration (Tbit).

Preferably, the shortened decay time ($T_{o\%}$) is shorter than the active time ($T_A$).

Preferably, the value of the third electrical potential ($MP_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential ($MP_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

EXAMPLE 7

Transmission Line State Controlled with Voltage Source

Example 7 concerns a bus driver (CANTR) for driving a differential data bus, whereby the differential data bus comprises a first single-wire data bus line (CH) and a second single-wire data bus line (CL). The bus driver (CANTR) preferably again has a transmit signal input. The transmit signal input of the bus driver (CANTR) is preferably connected to a transmit signal (TX). The transmit signal (TX) has a first transmit signal state and a second transmit signal state. Multi-value signals are possible. The bus driver (CANTR) has a first voltage source, in particular a first voltage regulator and/or voltage converter, which has an operating voltage between a first supply voltage line essentially at a first potential (HP) and a second supply voltage line essentially at a second potential (LP) and thus provides it to the bus driver for its operation. A first output of the bus driver (CANTR) is connected to the first single-wire data bus line (CH) and a second output of the bus driver (CANTR) is connected to the second single-wire data bus line (CL). The bus driver (CANTR) can have a first bus driver state and a second bus driver state. The bus driver (CANTR) is in the first bus driver state when the transmit signal (TX) is in the first transmit signal state. The bus driver (CANTR) then applies the first electrical potential (HP) to the first single-wire data bus line (CH) and the second electrical potential (LP) to the second single-wire data bus line (CL) when in the first bus driver state. The bus driver (CANTR) does not apply electrical potential to the first single-wire data bus line (CH) and to the second single-wire data bus line (C) when in the second bus driver state.

The second electrical potential (LP) is different from the first electrical potential (HP).

The bus driver (CANTR) of this example is characterized in that the bus driver (CANTR) has a third bus driver state and that the bus driver (CANTR) is in the third bus driver state when the transmit signal (TX) is in the second transmit signal state and when the transmit signal (TX) has made a state transition from the first transmit signal state to the second transmit signal state at a transition time point ($T_0$) and when an active time ($T_A$) has not yet elapsed since this transition time point ($T_0$). In order to safely distinguish this third bus driver state from the second bus driver state, the second bus driver state is restricted. Accordingly, the bus driver (CANTR) is only in the second bus driver state if the transmit signal (TX) is in the second transmit signal state and if the transmit signal (TX) has performed a state transition from the first transmit signal state to the second transmit signal state at a transition time point ($T_0$) and if an active time ($T_A$) has already elapsed since this transition time point ($T_0$).

The bus driver of this example is further characterized in that the bus driver (CANTR) has a second voltage source that generates a first center voltage that is essentially at a third potential ($MP_H$), and that the bus driver (CANTR) has a third voltage source that generates a second center voltage that is essentially at a fourth potential ($MP_L$).

The bus driver (CANTR) applies the fourth electrical potential ($MP_L$) to the first single-wire data bus line (CH) when in the third bus driver state. The bus driver (CANTR) applies the third electrical potential ($MP_H$) the second single-wire data bus line (CL) when in the third bus driver state.

The third electrical potential ($MP_H$) differs preferentially from the first electrical potential (HP) and from the second electrical potential (LP) and fourth electrical potential ($MP_L$). The fourth electrical potential ($MP_L$) differs preferably from the first electrical potential (HP) and the second electrical potential (LP). The value of the third electrical potential ($MP_H$) is preferably between the value of the first electrical potential (HP) and the value of the second electrical potential (LP). The value of the fourth electrical potential ($MP_L$) is preferably between the value of the first electrical potential (HP) and the value of the second electrical potential (LP).

Preferably, the bus driver (CANTR) is suitable and intended for the shortened fall time ($T_{\%}$) to be smaller than the active time ($T_A$). This is ensured e.g. by a sufficient low impedance of its outputs in the third operating state.

The active time ($T_A$) is preferably less than 70% of the data bit duration (Tbit).

Preferably, the value of the third electrical potential ($MP_H$) does not deviate by more than 25% and/or not more than 10% from the value of the second electrical potential (LP) plus half the value difference between the value of the first electrical potential (HP) minus the value of the second electrical potential (LP) plus half the absolute value of the minimum voltage magnitude difference (MD).

Preferably, the value of the fourth electrical potential ($MP_L$) does not deviate by more than 25% and/or not more than 10% from the value of the second electrical potential (LP) plus half the value difference between the value of the first electrical potential (HP) minus the value of the second electrical potential (LP) minus half the absolute value of the minimum voltage magnitude difference (MD).

Such a bus driver allows, at least in some implementations, a much higher data rate than state of the art devices. But the advantages are not limited to this. The disclosed system thus makes it possible to further increase the construction rate of the transceiver. In contrast to the technical teaching of U.S. Pat. No. 9,606,948 B2, it is functional.

LIST OF REFERENCE SIGNS

% additional driver or additional driver;
$\%_H$ third control line driver;
$\%_L$ fourth control line driver;
Bit0 zeroth data bit;
Bit1 first data bit;
Bit2 second data bit;
Bit3 third data bit;
CANCTR CAN controller;
CANTR CAN transceiver or bus driver;
C1H first capacitor;
C1L second capacitor;
CH first single-wire data line of the differential data bus. In the dominant data bus phase (DBM), the first single-wire data line is pulled by the bus driver to the first potential (VDD) with low impedance. In the recessive data bus phase (RBM), a state-of-the-art external circuit pulls the first single-wire data bus line back to a center potential (MP) with high impedance;
CL second single-wire data line of the differential data bus. In the dominant data bus phase (DBM), the second single-wire data line is pulled by the bus driver to the second potential (GND) with low impedance. In the recessive data bus phase (RBM), a state-of-the-art external circuit pulls the first single-wire data bus line back to a center potential (MP) with high impedance;
D1 first diode;
D2 second diode;
D3 third diode;
D4 fourth diode;
DBM dominant data bus phase. In this phase, the potential of the first single-wire data bus line (CH) is to be driven to a first potential (HP) by the bus driver at low impedance and the potential of the second single-wire data bus line (CL) is to be driven to a second potential (LP) at low impedance by the bus driver;
FDCTR FD controller;
GND reference potential line;
HP first potential. The first potential is preferably equal to the potential of the positive supply voltage line (VDD);
LP second potential. The second potential is preferably equal to the potential of the negative supply voltage line (GND);
µC microcomputer or computer system;
M main driver;
$M_H$ first control line driver;
$M_L$ second control line driver;
MD absolute value of the minimum voltage difference. In this disclosure the absolute value of the minimum voltage difference is assumed to be larger than zero to avoid infinite decay times ($T_{\%}$);
$MP_H$ third potential;
$MD_L$ fourth potential;
QG1 first control terminal of the first transistor (Q1);
QC2 second control terminal of the second transistor (Q2);
QG3 third control terminal of the third transistor (Q3);
Q4 fourth control terminal of the fourth transistor (Q4);
RBM recessive data bus phase. In this phase the potential of the first single-wire data bus line (CH) and the potential of the second single-wire data bus line (CL) should be at a center potential (MP). In the state of the art, this center potential is defined by an external circuit with high impedance so that it can be overwritten;
RH first resistor;
RL second resistor;
ST sampling time;
SU- acceleration line:
SUL acceleration logic;
$T_{\%}$ shortened decay time;
$T_0$ transition time point;
$T_A$ active time;
Tbit Data bit duration;
T decay waste time;
TX transmission signal;

LIST OF CITED DOCUMENTS

EP 2 635 971 B1,
U.S. Pat. No. 9,606,948 B2,
EP 3 217 602 B1.

What is claimed is:
1. A bus driver (CANTR) for controlling a differential data bus:
wherein the differential data bus comprises a first single-wire data bus line (CH) and a second single-wire data bus line (CL), and
wherein the differential data bus can be in a dominant data bus state (DBM) and in a recessive data bus state (RBM), and
wherein the bus driver (CANTR) in the dominant data bus state (DBM) connects the first single-wire data bus line (CH) to a first electrical potential (HP), and
wherein the bus driver (CANTR) in the dominant data bus state (DBM) connects the second single-wire data bus line (CL) to a second electrical potential (LP) different from the first electrical potential (HP), and
wherein the bus driver (CANTR) temporarily does not drive the first single-wire data bus line (CH) in the recessive data bus state (RBM) and wherein the bus driver (CANTR) temporarily does not drive the second single-wire data bus line (CL) in the recessive data bus state (RBM), wherein the bus driver (CANTR) in the recessive data bus state (RBM), after a change from the dominant data bus state (DBM) to the recessive data bus state (RBM), connects the first single-wire data bus line (CH) to a fourth electrical potential ($MP_L$) for an active time ($T_A$), and further wherein:

the bus driver (CANTR) in the recessive data bus state (RBM), after the change from the dominant data bus state (DBM) to the recessive data bus state (RBM), connects the second single-wire data bus line (CL) to a third electrical potential ($MP_H$) for the active time ($T_A$), and the third electrical potential ($MP_H$) is different from the first electrical potential (HP) and from the second electrical potential (LP), and the fourth electrical potential ($MP_L$) is different from the first electrical potential (HP) and from the second electrical potential (LP) and from the third electrical potential ($MP_H$), a value of the third electrical potential ($MP_H$) lies between a value of the first electrical potential (HP) and a value of the second electrical potential (LP), and a value of the fourth electrical potential ($MP_L$) lies between the value of the second electrical potential (LP) and the value of the third electrical potential ($MP_H$).

2. The bus driver (CANTR) according to claim 1, wherein:

the active time ($T_A$) is not more than 70% of a data bit duration (Tbit).

3. The bus driver (CANTR) according to claim 1:

wherein a first potential difference (MD) is a potential difference between the third electrical potential ($MP_H$) and the fourth electrical potential ($MP_L$); and wherein the value of the third electrical potential ($MP_H$) differs by not more than 25% from the value of the second electrical potential (LP) plus half a value difference between the value of the first electrical potential (HP) minus the value of the second electrical potential (LP) plus half of an absolute value of a maximum value of the first potential difference (MD); and wherein a minimum potential below which the first potential difference (MD) can decay is a potential difference between the potential of the first single-wire data bus line (CH) minus the potential of the second single-wire data bus line (CL).

4. The bus driver (CANTR) according to claim 1:

wherein a first potential difference (MD) is a potential difference between the third electrical potential ($MP_H$) and the fourth electrical potential ($MP_L$); and wherein the value of the fourth electrical potential ($MP_L$) differs by not more than 25% from the value of the second electrical potential (LP) plus half a value difference between the value of the first electrical potential (HP) minus the value of the second electrical potential (LP) minus half of an absolute value of a maximum value of the first potential difference (MD); and wherein a minimum potential below which the first potential difference (MD) can decay is a potential difference between the potential of the first single-wire data bus line (CH) minus the potential of the second single-wire data bus line (CL).

5. A bus driver (CANTR) for controlling a differential data bus:

wherein the differential data bus comprises a first single-wire data bus line (CH) and a second single-wire data bus line (CL), and wherein the bus driver (CANTR) has a state bus input and wherein the state bus input of the bus driver (CANTR) is connected to a state bus and wherein the state bus can have a first state bus state and wherein the state bus can have a second state bus state and wherein the state bus can have a third state bus state and wherein a first output of the bus driver (CANTR) is connected to the first single-wire data bus line (CH) and wherein a second output of the bus driver (CANTR) is connected to the second single-wire data bus line (CL) and wherein the bus driver (CANTR) has a first bus driver state and a second bus driver state and a third bus driver state, and wherein the bus driver (CANTR) is in the first bus driver state when the state bus is in the first state bus state and wherein the bus driver (CANTR) is in the second bus driver state when the state bus is in the second state bus state and wherein the bus driver (CANTR) is in the third bus driver state when the state bus is in the third state bus state and wherein the bus driver (CANTR) applies a first electrical potential (HP) to the first single-wire data bus line (CH) when in the first bus driver state and wherein the bus driver (CANTR) applies a second electrical potential (LP) to the second single-wire data bus line (CL) when in the first bus driver state and wherein the bus driver (CANTR) applies a fourth electrical potential ($MP_L$) to the first single-wire data bus line (CH) when in the third bus driver state and wherein the bus driver (CANTR) applies a third electrical potential ($MP_H$) to the second single-wire data bus line (CL) when in the third bus driver state and wherein the bus driver (CANTR) does not apply electrical potential to the first single-wire data bus line (CH) when in the second bus driver state, and wherein the bus driver (CANTR) does not apply electrical potential to the second single-wire data bus line (CL) when in the second bus driver state, and wherein the first electrical potential (HP) is different from the second electrical potential (LP) and wherein the third electrical potential ($MP_H$) is different from the first electrical potential (HP) and wherein the third electrical potential ($MP_H$) is different from the second electrical potential (LP) and wherein the fourth electrical potential ($MP_L$) is different from the first electrical potential (HP) and where the fourth electrical potential ($MP_L$) is different from the second electrical potential (LP) and wherein the fourth electrical potential ($MP_L$) is different from the third electrical potential (MPH) and wherein a value of the third electrical potential ($MP_H$) is between a value of the first electrical potential (HP) and a value of the second electrical potential (LP), and wherein a value of the fourth electrical potential ($MP_L$) is between the value of the third electrical potential ($MP_H$) and the value of the second electrical potential (LP).

6. The bus driver (CANTR) according to claim 5:
wherein a first potential difference (MD) is a potential difference between the third electrical potential ($MP_H$) and the fourth electrical potential ($MP_L$); and
wherein the value of the third electrical potential ($MP_H$) differs by not more than 25% from the value of the second electrical potential (LP) plus half a value difference between the value of the first electrical potential (HP) minus the value of the second electrical potential (LP) plus half of an absolute value of a maximum value of the first potential difference (MD); and
wherein a minimum potential below which the first potential difference (MD) can decay is a potential difference between the potential of the first single-wire data bus line (CH) minus the potential of the second single-wire data bus line (CL).

7. The bus driver (CANTR) according to claim 5:
wherein a first potential difference (MD) is a potential difference between the third electrical potential ($MP_H$) and the fourth electrical potential ($MP_L$); and
wherein the value of the fourth electrical potential ($MP_L$) differs by not more than 25% from the value of the second electrical potential (LP) plus half a value difference between the value of the first electrical potential (HP) minus the value of the second electrical potential (LP) minus half of an absolute value of a maximum value of the first potential difference (MD); and
wherein a minimum potential below which the first potential difference (MD) can decay is a potential difference between the potential of the first single-wire data bus line (CH) minus the potential of the second single-wire data bus line (CL).

8. The bus driver (CANTR) according to claim 5:
wherein the state bus has a transmit signal (TX) and an acceleration signal (SU).

9. A method for operating the bus driver (CANTR) according to claim 5, comprising:
Operating the bus driver (CANTR) in the first bus driver state;
Operating the bus driver (CANTR) in the third bus driver state for an active time ($T_A$) after a termination of the operation of the bus driver (CANTR) in the first bus driver state at a transition time point ($T_0$);
Operating the bus driver (CANTR) in the second bus driver state after termination of the operation of the bus driver (CANTR) in the first bus driver state at the transition time point ($T_0$) and after expiration of the subsequent active time ($T_A$).

10. The method according to claim 9:
wherein the active time ($T_A$) is less than 70% of a data bit duration (Tbit).

11. A bus driver (CANTR) for controlling a differential data bus,
wherein the differential data bus comprises a first single-wire data bus line (CH) and a second single-wire data bus line (CL), and
wherein the data bus can be in a dominant data bus state (DBM) and in a recessive data bus state (RBM), and
wherein the bus driver (CANTR) comprises a first voltage source having an operating voltage between a first supply voltage line substantially at a first potential (HP) and a second supply voltage line substantially at a second potential (LP), and wherein the bus driver (CANTR) in the dominant data bus state (DBM) connects the first single-wire data bus line (CH) to the first electrical potential (HP), and
the bus driver (CANTR), in the dominant data bus state (DBM), connecting the second single-wire data bus line (CL) to the second electrical potential (LP), which is different from the first electrical potential (HP), and
wherein the bus driver (CANTR) temporarily does not drive the first single-wire data bus line (CH) in the recessive data bus state (RBM) and
wherein the bus driver (CANTR) temporarily does not drive the second single-wire data bus line (CL) in the recessive data bus state (RBM),
further wherein:
the bus driver (CANTR) has a second voltage source which generates a first center voltage which is substantially at a third potential ($MP_H$), and
the bus driver (CANTR) has a third voltage source which generates a second center voltage which is substantially at a fourth potential ($MP_L$), and
the bus driver (CANTR) in the recessive data bus state (RBM), after a change from the dominant data bus state (DBM) to the recessive data bus state (RBM), connects the first single-wire data bus line (CH) to the fourth electrical potential ($MP_L$) for the active time ($T_A$), and
the bus driver (CANTR) in the recessive data bus state (RBM), after a change from the dominant data bus state (DBM) to the recessive data bus state (RBM), connects the second single-wire data bus line (CL) to the third electrical potential ($MP_H$) for the active time ($T_A$), and
the third electrical potential ($MP_H$) is different from the first electrical potential (HP) and from the second electrical potential (LP), and
the fourth electrical potential ($MP_L$) is different from the first electrical potential (HP) and from the second electrical potential (LP) and from the third electrical potential ($MP_H$), and
a value of the third electrical potential ($MP_H$) lies between a value of the first electrical potential (HP) and a value of the second electrical potential (LP), and
a value of the fourth electrical potential ($MP_L$) lies between the value of the third electrical potential ($MP_H$) and the value of the second electrical potential (LP).

12. The bus driver (CANTR) according to claim 11, wherein:
the active time ($T_A$) is not more than 70% of a data bit duration (Tbit).

13. The bus driver (CANTR) according to claim 11:
wherein a first potential difference (MD) is a potential difference between the third electrical potential ($MP_H$) and the fourth electrical potential ($MP_L$); and
wherein the value of the third electrical potential ($MP_H$) differs by not more than 25% from the value of the second electrical potential (LP) plus half a value difference between the value of the first electrical potential (HP) minus the value of the second electrical potential (LP) plus half of an absolute value of a maximum value of the first potential difference (MD); and
wherein a minimum potential below which the first potential difference (MD) can decay is a potential difference between the potential of the first single-wire data bus line (CH) minus the potential of the second single-wire data bus line (CL).

14. The bus driver (CANTR) according to claim 11:
wherein a first potential difference (MD) is a potential difference between the third electrical potential ($MP_H$) and the fourth electrical potential ($MP_L$); and
wherein the value of the fourth electrical potential ($MP_L$) differs by not more than 25% from the value of the second electrical potential (LP) plus half a value difference between the value of the first electrical potential (HP) minus the value of the second electrical potential (LP) minus half of an absolute value of a maximum value of the first potential difference (MD); and
wherein a minimum potential below which the first potential difference (MD) can decay is a potential difference between the potential of the first single-wire data bus line (CH) minus the potential of the second single-wire data bus line (CL).

\* \* \* \* \*